UNITED STATES PATENT OFFICE.

ERIC HJALMAR WESTLING, OF ANTIOCH, CALIFORNIA.

PROCESS OF OBTAINING POTASSIUM AND OTHER ALKALI-METAL COMPOUNDS.

1,349,113.  Specification of Letters Patent.  Patented Aug. 10, 1920.

No Drawing.  Application filed October 14, 1918. Serial No. 258,025.

*To all whom it may concern:*

Be it known that I, ERIC HJALMAR WESTLING, a citizen of the United States, and a resident of Antioch, county of Contra Costa, and State of California, have invented a certain new and useful Process of Obtaining Potassium and other Soluble Alkali-Metal Compounds, of which the following is a specification.

The invention relates to a process of separating potassium and other alkali metals in the form of water soluble compounds from insoluble alkali metal silicates.

An object of the invention is to provide a process of converting the alkali metal in insoluble alkali silicates to a water soluble alkali metal compound.

Another object of the invention is to provide a process of producing substantially pure alkali metal sulfates from insoluble alkali metal silicates.

The invention possesses other advantageous features, some of which, with the foregoing, will be set forth at length in the following description where I shall outline in full the preferred method of carrying out the process of my invention. In such description I shall describe the process in connection with the recovery of soluble potassium compounds, but it is to be understood that the process is applicable to other alkali metal and is not limited to potassium.

The process of my invention is particularly applicable to the recovery of water soluble alkali metal compound form, from insoluble anhydrous alkali metal silicates and I will so describe it herein. I have found that by heating a mixture of a heavy metal sulfate and an anhydrous alkali metal silicate to certain temperatures under certain conditions, that a reaction occurs in which soluble alkali metal sulfate is formed. Taking ordinary potash feldspar as the anhydrous alkali metal silicate and ferric sulfate as the heavy metal sulfate, as an illustration, the reaction is essentially as follows:

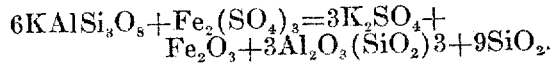

The heavy metal sulfate is preferably ferric or aluminum sulfate, but ferrous sulfate, copper, zinc or lead sulfates may be employed and will act in a similar manner, but probably not as efficiently. The heavy metal sulfate employed should have a high decomposition temperature, so that it will not be broken down before the desired temperature for reaction is reached. Different anhydrous silicates require different temperatures for the best results, but I have found that in every case about 550° C. is the maximum temperature, since above that temperature the reverse reaction will occur due to the greater stability of silicates as compared to sulfates at high temperature. A high temperature however is required to decompose the ferric or aluminum sulfate but a working margin of more than 100° C. exists, since the reaction occurs between 450° C. and 550° C. in the case of potash feldspar and between 400° C. and 500° C. in the case of lepidolite.

Ordinarily ferric or aluminum sulfate will not decompose at a temperature as low as 400° C. but I have found that in the presence of an alkali metal silicate this decomposition takes place readily at this temperature.

The reaction is probably due to the activity of sulfuric acid at the high temperatures prevailing, the acid being in a condition very similar to the nascent state in the case of atoms. Sulfuric acid at a temperature near to but below red heat will decompose most silicates, but the difficulty of maintaining such a condition without pressure and with attendant vessel material difficulties has made it technically impossible to utilize this property of sulfuric acid. When a heavy metal sulfate with high decomposition temperature is used, however, this difficulty disappears, as the newly released acid acts continuously on the silicate, thus producing a continuous reaction, without presenting at any time a large amount of free acid. The presence of water vapor facilitates the reaction, but it is not essential.

In practice, I prefer to evaporate a ferric or an aluminum sulfate solution to the consistency of a thick syrup and then mix the finely ground alkali metal silicate into the hot syrupy mass and then discharge the mixture onto a cooling plate of suitable metal, such as iron or copper and allow the mixture to cool and set into a cake. This cake is later placed in a rotary heater where the proper temperature is maintained by interior or exterior heating or both. The lumps of undecomposed cake act as a stirring agency in the rotary furnace and when all of the lumps are disintegrated the reaction will be as nearly complete as is technically possible. A rotary furnace such as is used in the manufacture of cement is excellent for this purpose. The mass is discharged from the furnace, cooled, and leached with water, after which the solution is separated from the insoluble residue by decantation, filtering or otherwise. The alkali metal sulfate solution is then treated according to standard methods for eventual utilization in the arts.

I claim—

1. The process of obtaining soluble alkali metal compounds from anhydrous alkali metal containing substances which comprises heating a mixture of the substance and a heavy metal sulfate to a temperature sufficiently high to decompose the sulfate in the presence of the substance.

2. The process of obtaining alkali metal sulfates from anhydrous alkali metal containing substances which comprises heating a mixture of the substance and a heavy metal sulfate to a temperature above 350° C.

3. The process of obtaining alkali metal sulfates from insoluble anhydrous alkali silicates which comprises heating a mixture of finely divided alkali metal silicate and a heavy metal sulfate to decompose the heavy metal sulfate and form alkali metal sulfate.

4. The process of obtaining alkali metal sulfate from insoluble anhydrous alkali metal silicates which comprises heating a mixture of alkali metal silicate and ferric sulfate to a temperature sufficiently high to decompose the ferric sulfate.

5. The process of obtaining alkali metal sulfate from insoluble alkali metal silicates which consists in mixing finely divided silicate and a thick solution of a heavy metal sulfate, allowing the mass to set and form a cake and heating the cake to a temperature sufficiently high to cause the formation of alkali metal sulfate.

6. The process of obtaining alkali metal sulfate from insoluble alkali metal silicate, which consists in mixing finely divided silicate and a thick solution of a heavy metal sulfate, allowing the mass to set and form a cake, agitating and heating the cake to cause decomposition of the heavy metal sulfate and the formation of alkali metal sulfate and separating the alkali metal sulfate from the roasted mass.

7. The process of decomposing insoluble anhydrous alkali metal silicates comprising heating a mixture of the silicate and a material which decomposes at high temperature to release sulfuric acid, to such temperature.

In testimony whereof, I have hereunto set my hand at San Francisco, California, this 7th day of October 1918.

ERIC HJALMAR WESTLING.

In presence of—
H. G. PROST.